United States Patent [19]

Flander

[11] Patent Number: 4,565,457
[45] Date of Patent: Jan. 21, 1986

[54] RADIAL, RADIAL ANGULAR-CONTACT, AND AXIAL ANGULAR-CONTACT BALL BEARING

[75] Inventor: Hans Flander, Nuremberg, Fed. Rep. of Germany

[73] Assignee: Georg Muller Kugellager-Fabrik K.G., Fed. Rep. of Germany

[21] Appl. No.: 281,933

[22] Filed: Jul. 10, 1981

Related U.S. Application Data

[63] Continuation-in-part of Ser. No. 840,153, Oct. 7, 1977, abandoned.

[30] Foreign Application Priority Data

Oct. 7, 1976 [DE] Fed. Rep. of Germany ....... 2645287

[51] Int. Cl.[4] .............................................. F16C 33/58
[52] U.S. Cl. .................................... 384/450; 384/516; 384/615
[58] Field of Search ............... 308/174, 177, 188, 193, 308/195, 219, 235; 29/148.4 R; 384/450, 516, 615

[56] References Cited

U.S. PATENT DOCUMENTS

| 1,587,184 | 6/1926 | Riebe | 308/193 |
| 2,142,474 | 1/1939 | Langhaar | 308/188 |
| 2,142,478 | 1/1939 | Murden | 308/193 |

FOREIGN PATENT DOCUMENTS

| 209101 | 3/1925 | United Kingdom | 308/188 |
| 320655 | 8/1976 | U.S.S.R. | 308/188 |

Primary Examiner—Lenard A. Footland
Attorney, Agent, or Firm—Steinberg & Raskin

[57] ABSTRACT

A ball bearing which is to function as a radial, radial angular-contact, and axial angular-contact bearing includes coaxial inner and outer races respectively formed with ball grooves which face each other, the bearing having a plurality of balls of a given ball radius situated between these races and extending into the grooves thereof so as to have rolling contact with the races. At least one of these races has in an axial plane which contains the common axis of the races a cross-sectional configuration according to which the innermost part of the groove of this one race has a radius of curvature which is somewhat greater than the radius of the ball, e.g., about 51.6% of the diameter of the ball, with the radius of curvature of the latter groove gradually increasing from the innermost part thereof up to a pair of opposed side edges of the groove. The continuous increase in this radius of curvature from the innermost part of the groove to the opposed side edges thereof is such that the radial clearance between the ball and the race groove is generally greater than what the radial clearance would be if the race curvature were that of a circle whose radius is substantially 51.6% of the diameter of the ball. Additionally, the continuous increase in the radius of curvature of the race groove is such that the difference between the radius of curvature of the innermost part of the groove and the ball radius and the difference between the radius of curvature at each of the side edges of the groove and the ball radius increases by at least a factor of 2.

7 Claims, 10 Drawing Figures

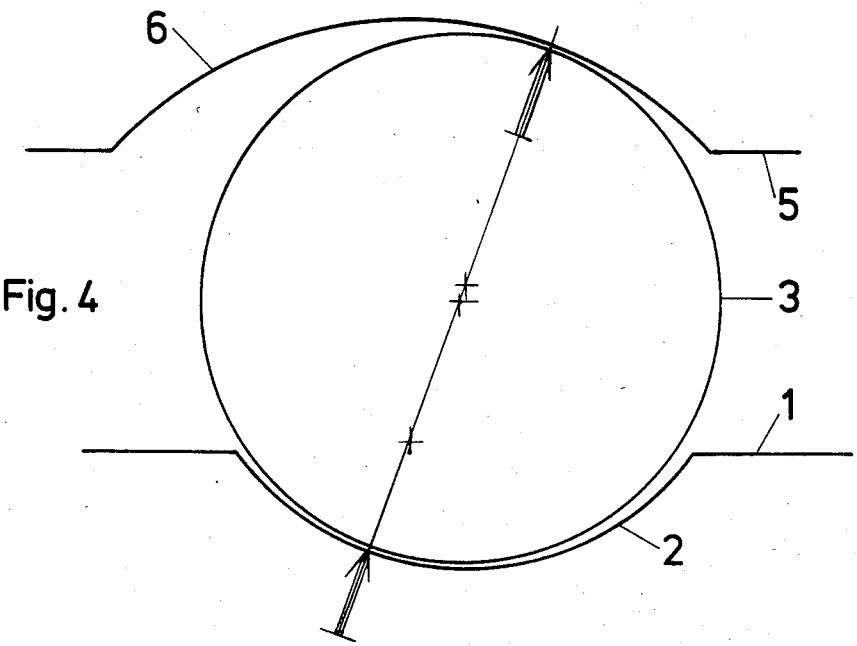
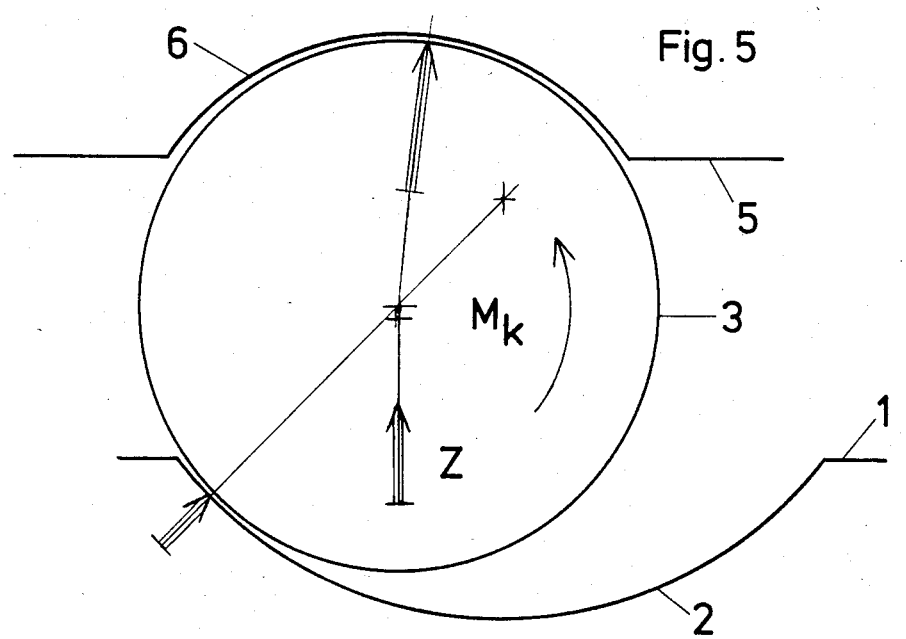

Fig. 8
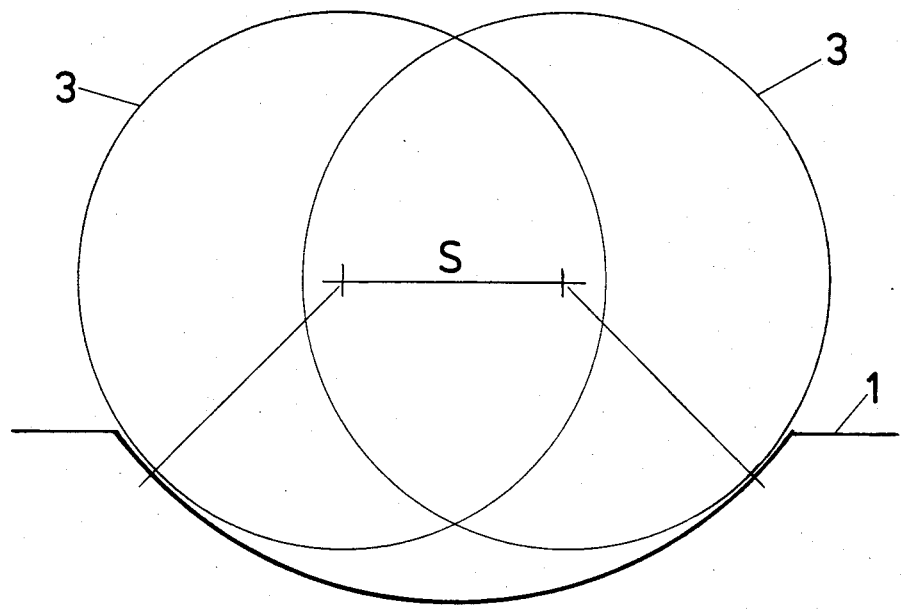
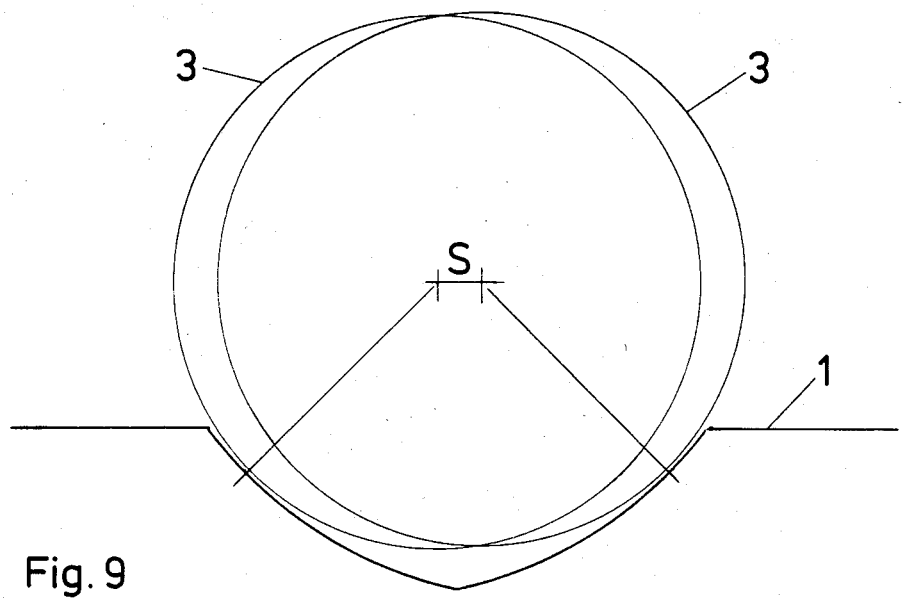
Fig. 9

RADIAL, RADIAL ANGULAR-CONTACT, AND AXIAL ANGULAR-CONTACT BALL BEARING

BACKGROUND OF THE INVENTION

This application is a continuation-in-part of application Ser. No. 840,153 filed Oct. 7, 1977, abandoned.

The present invention relates to ball bearings.

In particular, the present invention relates to radial, radial angular-contact, and axial angular-contact ball bearings which include inner and outer races respectively formed with grooves which face each other and which receive balls which extend into said grooves to have rolling contact therein with respect to said races, the groove of at least one of the races having a special curvature according to the present invention. Conventional ball bearings include races which have at their grooves in an axial plane containing the common axis of the races a cross-sectional configuration which forms an arc of a circle. In the event that, for example, a radial ball bearing or a radial angular-contact ball bearing is axially loaded, then the ball of such a bearing no longer travels along the innermost part of the race grooves, but instead the connecting line between the point of contact of the inner race with the ball and the center of the ball or between the center of the ball and the point of contact with the outer race forms a given angle with respect to a plane normal to a plane containing the common axis of the races. This latter angle increases with an increasing axial load as a result of the elastic deformation at the contact zone between the race and ball. In the case where the race groove has a relatively close fit with respect to the ball, which is to say the radius of curvature of the race groove in any axial plane is only slightly greater than the ball radius, this latter angle increases very rapidly. However, in the case where the ball has a relatively loose fit in the groove, which is to say the race groove has in any axial plane a cross-sectional configuration of an arc of a circle whose radius is sufficiently greater than the ball radius to provide for the latter a substantial clearance in the groove, this angle increases more slowly with an increasing axial load. The rapid increase in the size of the latter angle has certain disadvantages. Thus this angle should not increase so greatly that the Hertz type of pressure ellipse extends all the way up to the side edge of the groove, since in this event there will be a localized overloading. Moreover, when the above angle is relatively large there is an undesirable increase in the sliding contact between the ball and the races, particularly with high-speed bearings where the inner race angle becomes greater than the outer race angle. Moreover, with combined axial and radial loading, it is necessary for each ball to change its turning axis in the bearing between the radially loaded zone and the opposed zone, and such pronounced changes in the turning axis of each ball have an unfavorable influence on the operating characteristics of the bearing.

In order to avoid relatively large angles of the above type and relatively large changes in these angles, it is customary in the art to increase the radius of curvature of the circular arc at the cross section of the groove radius, so that, in other words, a relatively loose fit with relatively large clearance is provided for the balls. Such a construction, however, reduces the capability of the bearing to carry radial loads.

Known ball bearings which are required to be subjected to relatively large radial forces preferably have only a relatively small ball clearance in the race grooves so that the balls of such bearings have a relatively close fit in the race grooves. On the other hand, bearings which are required to be subjected to relatively large axial forces are preferably made with a relatively loose fit in the grooves for the balls, such grooves having in cross section a radius of curvature substantially larger than the radius of curvature of each ball.

Similar differences are encountered in the art in connection with optimal constructions for bearings which are designed to operate at low and high speeds of rotation. Bearings designed to operate at low speeds preferably have an inner race the groove of which has only a small clearance with respect to the ball received therein while at the outer race of such bearing the groove has a looser fit providing a greater clearance for the balls, since in order to achieve a given load-carrying capacity for such bearings the curvatures are different at both of the primary axes of the particular contact point between each ball and the inner race on the one hand and the outer race on the other hand. The path of travel for the balls at the outer race is in the latter case concave at both of the primary axes, while at the inner race this path of travel is in one primary axis concave and in the other convex. By a suitable selection of the clearance between the balls and both races, namely a relatively small clearance for the inner race and a relatively large clearance for the outer race, the stresses, which is to say the Hertz pressure area, of both races is approximately equal and thus it is possible to achieve an optimal wear for the bearing.

In a ball bearing which is operated at an extremely high speed of rotation, the inertia forces of the balls, particularly the centrifugal force, increase to a considerable extent. The centrifugal forces acting on the balls must be taken up by the outer race so that at a particularly high speed of operation the outer race is loaded to a considerably greater extent than the inner race. Moreover, where such relatively large forces exist, there is a relatively great elastic deformation at the zone where the balls contact the outer race. This latter factor results practically in an increase in the radial bearing clearance and thus in an increase of the contact angle at the location where each ball contacts the inner race, while at the same time the balls at the outer race are pressed toward the innermost part of the groove of the outer race as a result of the centrifugal force.

With a conventional relatively small clearance for the balls at the inner race, the contact angle between the ball and the inner race thus increases very rapidly. This latter rapid increase in the contact angle can be avoided by providing a larger ball clearance at the groove of the inner race inasmuch as the latter is subjected only to a relatively small load. Thus, for high-speed ball bearings, there exists the principle of construction according to which there is a relatively small ball clearance at the outer race which is subjected to a great load and a relatively large clearance at the inner race which is subjected to a lesser load. Thus, this latter relationship is directly opposed to the relationship required for bearings which are designed to operate at slow speeds of rotation.

Up to the present time bearings have been constructed in such a way that a compromise is selected between the opposed construction requirements for the low and high speed bearings, and the result is that conventional bearings do not provide optimal operation for slow-speed requirements or high-speed requirements, or in certain individual cases the bearings have been designed only for special requirements to achieve optimal operation under special conditions of use.

In the course of improving machines in which ball bearings are utilized, it is also desirable to achieve optimum properties for the ball bearings designed for the particular purposes of such machines. The new technologies have accelerated these developments. The best high-speed grinding, for example, requires ball bearings which will operate satisfactorily at high speeds of rotation in connection with relatively large bores where the shaft requires a large stiffness. Conventionally constructed bearings cannot achieve these results. On the other hand, relatively light constructions require relatively small dimensions for the components of such structures, so that for such machines smaller bearings of large load-carrying capacity are required. Optimization of ball bearings with respect to special uses thereof is opposed by the desire on the part of users and manufacturers to economize by keeping the number of different constructions of the bearings as small as possible.

SUMMARY OF THE INVENTION

It is accordingly a primary object of the present invention to provide ball bearings of the type referred to above, which, however, are capable of fulfilling highly differing requirements in an optimal manner. Such optimal operation for widely differing requirements is not possible with presently known ball bearings wherein the race grooves have in cross section the configuration of an arc of a circle and where in order to attempt to achieve optimal operation it is necessary to combine incompatible features which in fact cannot be combined with each other.

In addition it is an object of the present invention to provide a ball bearing construction which can be readily manufactured economically.

According to the invention at least one of the races has at its groove in an axial section the configuration of a curve which at the innermost part of the groove has a radius of curvature which is somewhat greater than the radius of the ball, e.g., about 51.6% of the diameter of the ball, with this radius of curvature of the groove continuously increasing toward the opposed side edges of the groove in a manner such that the radial clearance between the ball and the race groove is generally greater than what the radial clearance would be if the race curvature were that of a circle whose radius is substantially 51.6% of the diameter of the ball. Additionally, the continuous increase in the radius of curvature of the race groove is such that the difference between the radius of curvature at the innermost part of the groove and the ball radius increases to a difference between the radius of curvature at each side edge of the groove and the ball radius which is greater than this difference between the radius of curvature of the innermost part of the groove and the ball radius by at least a factor of 2.

In the description which follows, reference to a race means is intended to imply a race which may be in the form of a separate ring assembled either with a shaft or housing or in the form of a member such as a flange which may be integrally formed with a shaft or a housing and which is formed with the groove for receiving the balls.

The construction of the present invention can be provided at the outer race means of the ball bearing. In this case the ball bearing is particularly suited for low-speed bearings which are axially and radially loaded. In the event that the construction of the invention is applied to the inner race means, then the bearing of the invention is particularly suited for use at low as well as high speeds of operation and for axial as well as radial loading, so that the application of the construction of the invention to the inner race means is particularly preferred. This latter construction is also preferred for manufacturing reasons, since with presently used machines for manufacturing ball bearings the inner race means can be provided in an extremely simple manner with the groove construction according to the present invention.

In the event that the construction of the present invention is applied to the outer race means as well as to the inner race means, then a ball bearing is provided which is capable of optimal operation for all purposes, although in actual practice as a rule it is sufficient for all requirements which are likely to be encountered if the construction of the present invention is applied only to the groove of the inner race means.

It is furthermore to be noted that the groove construction of the invention can be used for low operating speeds either for the inner race means or for the outer race means since at low speeds of revolution the sum of the ball clearance at the inner and outer race means is the critical factor in connection with the contact angle of the bearing and thus in connection with the inner bearing geometry.

According to the invention the ball-receiving groove of at least one of the race means of a ball bearing has in axial section a cross-sectional configuration in the form of a portion of a conic section, in particular, the peak portion of a conic section, particularly an ellipse, parabola and hyperbola. Inasmuch as the geometric formulae of such curves are extremely simple, such curves can be manufactured in a simple and extremely accurate manner. It is, however, possible also to utilize for the purposes of the invention cross-sectional configurations for the race grooves which form part of a sine curve or part of cycloid or spiral, etc., if the basic requirements of the present invention is fulfilled, these basic requirements being that the innermost part of the race groove has a radius of curvature which is somewhat greater than the radius of the ball, e.g., about 51.6% of the diameter of the ball, and that starting from the innermost part of the race groove and continuing therefrom to each side edge of the race groove there is a curvature of constantly increasing radius with the radial clearance between the ball and the race groove being generally greater than what the radial clearance would be if the race curvature were that of a circle whose radius is substantially 51.6% of the diameter of the ball. Preferably, the race groove of the invention has in an axial section the configuration of part of ellipse at the region of an end of the major axis thereof, since such an elliptical configuration can be manufactured at low cost with conventional manufacturing machines.

As has already been referred to above, the difference between the radius of curvature of the race groove and the ball radius (which is to say the radius of curvature of the groove minus the ball radius) increases from the innermost part of the race groove to each of its opposed side edges, and in accordance with the invention this increase has at least a factor of 2, although preferably this difference increases by a factor in the region of from 3 to 4. In other words, the difference between the radius of curvature of the race groove and the ball radius at a side edge region of the race groove is at least twice as great as the difference between the radius of curvature of the innermost part of the race groove and the ball radius. The radius of curvature of the race groove from its innermost part to each of its opposed side edges can increase continuously either at a constant rate or at a progressively increasing rate.

In connection with the state of the prior art, reference may be made to German Offenlegungsschrift No. 2,019,380, where there is a disclosure of angular-contact ball bearing in which the groove of the outer race has the configuration of an arc of an ellipse, but where at the innermost part of the groove the radius of curvature is smaller than the ball radius and the ball has at the outer race a pair of separate contact zones.

U.S. Pat. No. 2,142,474 (Langhaar) discloses a bearing wherein the race groove comprises three separate arcs, the central arc being circular and the two adjacent arcs having variable curves with radii of any number or size, provided that at their contact points, they are of greater radius than that of the central arc. As such, the radius of curvature of the race groove does not increase in a continuous manner.

U.S. Pat. No. 1,587,184 (Riebe) discloses a bearing having a race groove which follows a curve of increasing curvature and hence a decreasing radius of curvature outwardly from the innermost part thereof.

U.S. Pat. 2,142,478 (Murden) discloses a bearing wherein the race groove follows an elliptical path wherein the innermost part of the race groove has a radius of curvature which is essentially or "practically" equal to the radius of the ball and wherein the radius of curvature of the groove continuously increases outwardly from the innermost part thereof, but in a manner such that the radial clearance between the ball and the race groove is always less than what the radial clearance would be if the race curvature were that of a circle whose radius is substantially 51.6% of the diameter of the ball.

In this connection, Murden gives two illustrative examples of race grooves for use with balls having a one-half inch diameter, namely, ones which follow elliptical arcs defined by the well known equation $$\frac{x^2}{a^2} + \frac{y^2}{b^2} = 1,$$

wherein a and b are the major and minor semi-axes of the ellipse, respectively. In the first example, a=0.34602 inches and b=0.29412 inches. In the second example, a=0.36189 inches and b=0.30079 inches. Using the known equation $r_i=b^2/a$, where $r_i$ is the radius of curvature of the elliptical race groove at its innermost part, it is seen that $r_i$ in the first example is 0.2500045 inches and in the second example $r_i=0.2500058$ inches. Thus, for all practical purposes, the radius of curvature of the innermost part of the race groove is the same as the radius of the one-half inch diameter ball.

Furthermore, it is a specific object of Murden to provide that the radius of curvature of the race groove increase in a manner such that the radial clearance between the ball and race groove is always significantly less than what the radial clearance would be if the race curvature were that of a circle whose radius is substantially 51.6% of the diameter of the ball. For example, the radial clearance in the first example of the Murden race groove and the ball at 12° is 2 thousandths of an inch whereas the radial clearance between an identical ball and a circular race having a radius which is 51.6% of the diameter of the ball at 12° is 17 one-hundred thousandths of an inch.

Although the particular design suggested by Murden theoretically provides a large supporting capacity for the bearing, there will be a considerable heating of the bearing during operation and necessitates extremely close tolerances in manufacture. Further, the bearing design disclosed in Murden is not suitable for high speed application.

BRIEF DESCRIPTION OF DRAWINGS

The invention is illustrated by way of example in the accompanying drawings which form part of this application and in which:

FIG. 4 is a fragmentary sectional elevation schematically illustrating a conventional angular-contact ball bearing designed for low operating speeds;

FIG. 5 is a fragmentary sectional elevation schematically showing part of a conventional angular-contact ball bearing designed for high speeds;

FIG. 8 illustrates how the structure of FIG. 2 operates with a changing axial load;

FIG. 9 is a schematic fragmentary sectional elevation illustrating a conventional four-point bearing.

DESCRIPTION OF PREFERRED EMBODIMENTS

In connection with the drawings, the ratio between the ball radius and groove radius has been shown at an enlarged scale for the sake of clearly illustrating the invention, although the geometric relationships have been accurately maintained.

Figure 1:
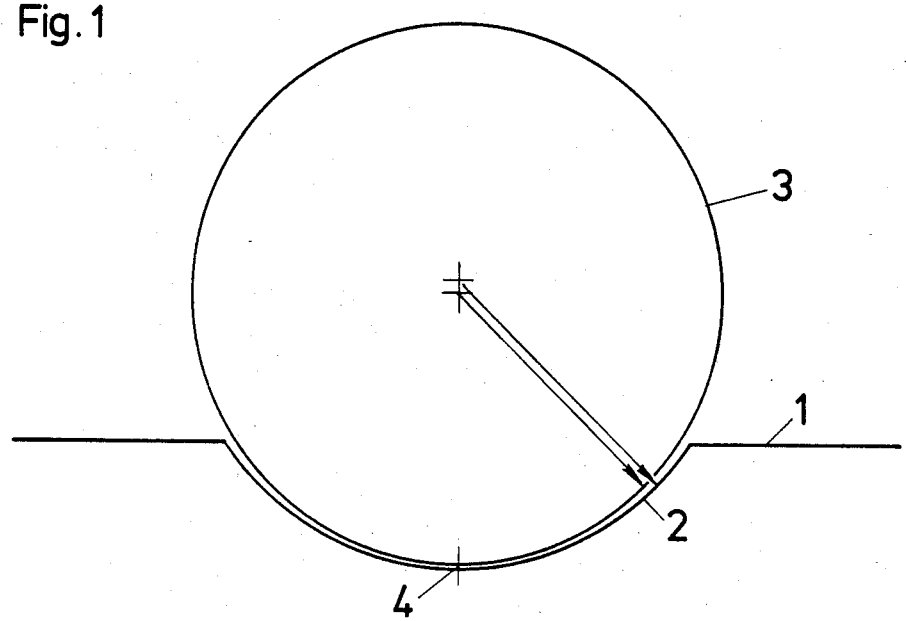
FIG. 1 is a fragmentary sectional elevation of part of a conventional ball bearing intended for relatively great radial loads.

FIG. 1 illustrates in an axial section a conventional ball bearing designed for large radial loads, this bearing having the illustrated inner race means 1 provided with a groove 2 which in the axial section of FIG. 1 forms an arc of a circle. Thus it is to be understood that the axis of the race means 1 which is fragmentarily illustrated in FIG. 1 extends horizontally and is situated beneath the groove 2, as viewed in FIG. 1. Thus the section of FIG. 1 contains the axis of the bearing. This bearing includes the ball 3 which of course extends into the groove 2 of the inner race means 1. Between the groove 2 and the ball 3 there is a relatively small radial bearing clearance 4.

Figure 2:
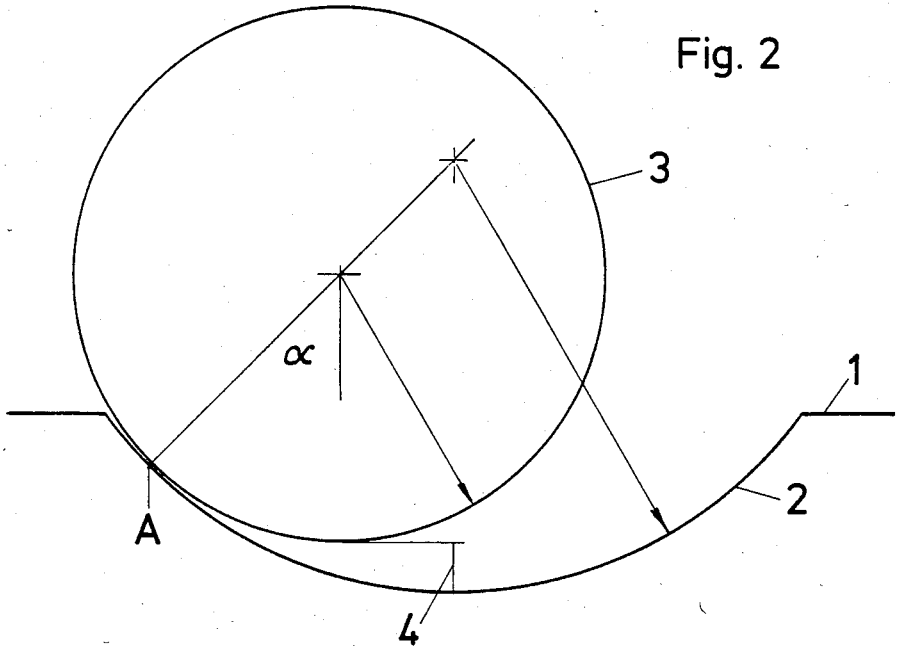
FIG. 2 is a fragmentary schematic sectional elevation of part of a conventional ball bearing intended for great axial loads.

In the axial section of FIG. 2 there is illustrated a conventional ball bearing designed for large axial loads, this bearing being illustrated in FIG. 2 in an axially loaded condition. Thus the arc of the circle which forms the cross section of the groove 2 of FIG. 2 has a radius larger than the radius of curvature of the groove 2 of FIG. 1. The ball 3 of FIG. 2 contacts the inner race means 1 of FIG. 2 at the point of contact A while providing the contact angle α, this angle of course being the angle formed between a plane normal to the axis of the bearing and containing the center of the ball 3 and the line of contact between the center of the ball 3 and the point A. Thus with the construction of FIG. 2 there is between the ball 3 and the surface of the groove 2 a much larger clearance 4 than is the case with FIG. 1, so that with the construction of FIG. 2 there is a larger radial clearance.

Figure 3:
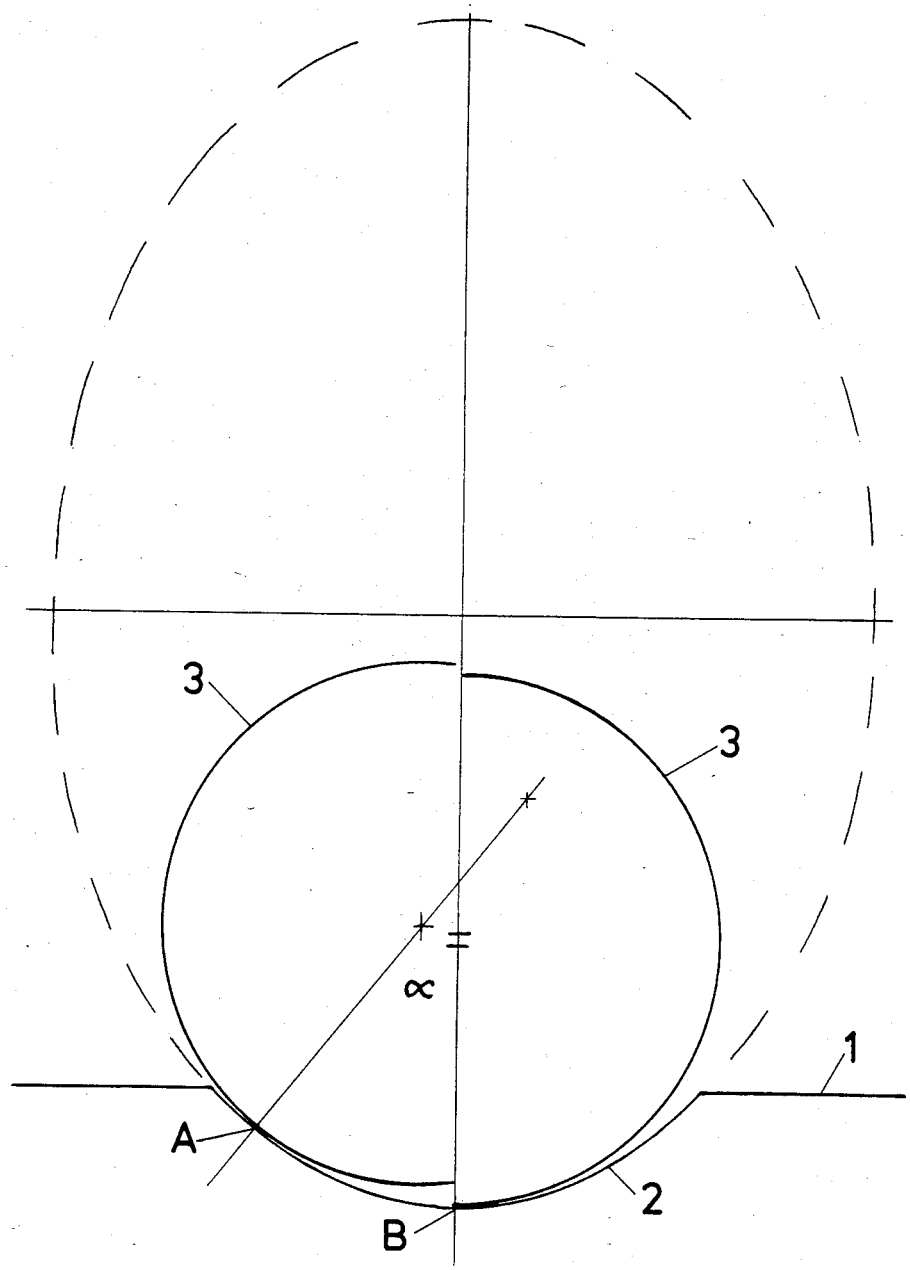
FIG. 3 is a schematic fragmentary sectional elevation of a ball bearing according to the present invention designed for great radial loading as well as great axial loading.

Referring now to the bearing of the invention which is illustrated in FIG. 3, in an axial section in the same way as the bearings of FIGS. 1 and 2, the groove 2 of the inner race means 1 has in the illustrated cross section the configuration of part of an ellipse, the remainder of which is shown in phantom lines in FIG. 3. Thus it will be seen that the cross section of the groove 2 conforms to the curvature of the ellipse at an end region of the major axis thereof with the groove 2 being symmetrical on both sides of this major axis of the ellipse. The curve illustrated in FIG. 3 has at the peak of the curve which forms the innermost part of the groove 2 the smallest radius of curvature. Progressing from the innermost part B of the groove 2 toward each of its opposed side edges, this radius of curvature becomes constantly greater. At the left side of the major axis of the ellipse illustrated in FIG. 3 the bearing of FIG. 3 is shown in its axially loaded condition while at the right side the bearing is shown in its radially loaded condition.

In the axially loaded condition shown at the left of FIG. 3, the ball 3 engages the surface of the groove 2 at the contact point A. This radius of curvature of the groove 2 of FIG. 3 at the point A is equal to the radius of curvature of the groove 2 of FIG. 2. In the radially loaded condition shown at the right in FIG. 3, the ball contacts the groove at the innermost part thereof, which is to say at the point B forming the end of the major axis of the illustrated ellipse. The radius of curvature of the groove 2 at the point B is equal to the smaller radius of curvature for the groove of the tearing of FIG. 1.

Thus, it is apparent from FIGS. 1-3 that the bearing of the invention shown in FIG. 3 has under radial loading conditions the advantages of the bearing of FIG. 1 which is designed to provide optimal operation at high radial loads, while under conditions of axial loading the bearing of the invention shown in FIG. 3 has all of the advantages of the construction of FIG. 2 which is designed for optimal operation under high axial loads.

A conventional angular-contact ball bearing for low operating speeds is shown in FIG. 4. In this case the inner race means 1 has at its groove 2 an arc of a circle whose radius of curvature is only slightly greater than the radius of the ball 3, so that a relatively close fit for the ball 3 is provided at the groove 2 of the inner race 1 of FIG. 4. The outer race 5 also has a groove which in cross section has the configuration of an arc of a circle, but in FIG. 4 this groove 6 has a greater radius than the groove 2 so as to provide a relatively large clearance and a loose fit for the ball 3. The force transmitted from the inner race 1 to the ball 3 is in its direction and magnitude the same as the force transmitted from the ball 3 to the outer race 5 of FIG. 4, inasmuch as there are no further forces.

In FIG. 5 there is schematically illustrated a conventional angular-contact ball bearing designed for high speeds of rotation. This bearing of FIG. 5 has an outer race 5 which at its groove 6 has the curvature of an arc of a circle whose radius is only slightly greater than the radius of the ball 3, so that the latter has a close fit in the groove 6. The groove 2 of the inner race 1 of FIG. 5, however, has a relatively loose fit with a larger clearance and of course larger radius of curvature than the groove 6. With the construction of FIG. 5 as a result of the forces of inertia, namely contrifugal force and the gyroscopic couple or moment, the force transmitted from the inner race to the ball is not equal either in magnitude or direction to the force transmitted between the ball and the outer race.

Figure 6:
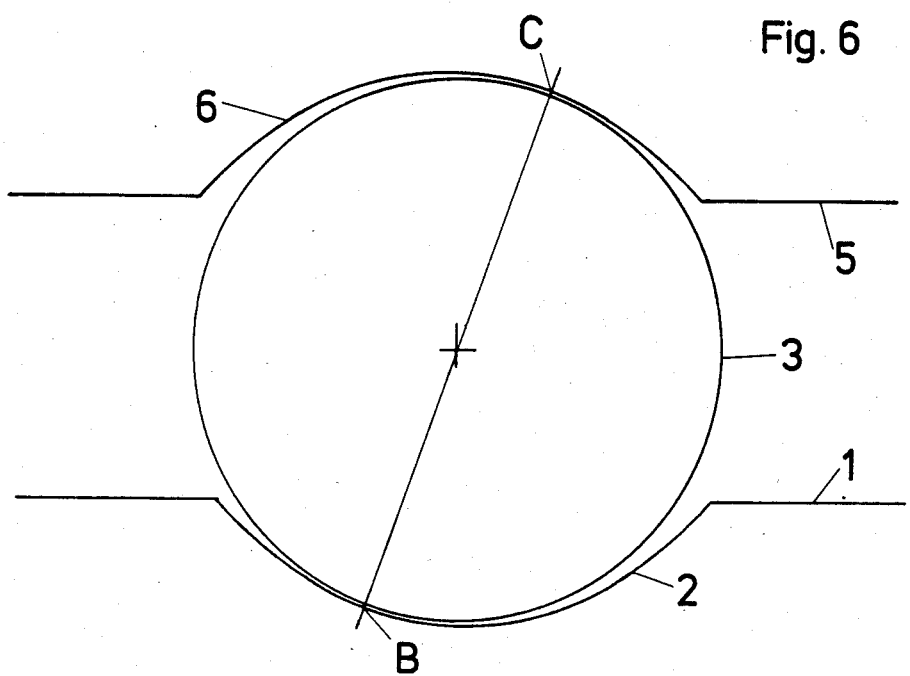
FIG. 6 is a fragmentary schematic sectional elevation of a ball bearing according to the invention shown for low speeds of rotation.
Figure 7:
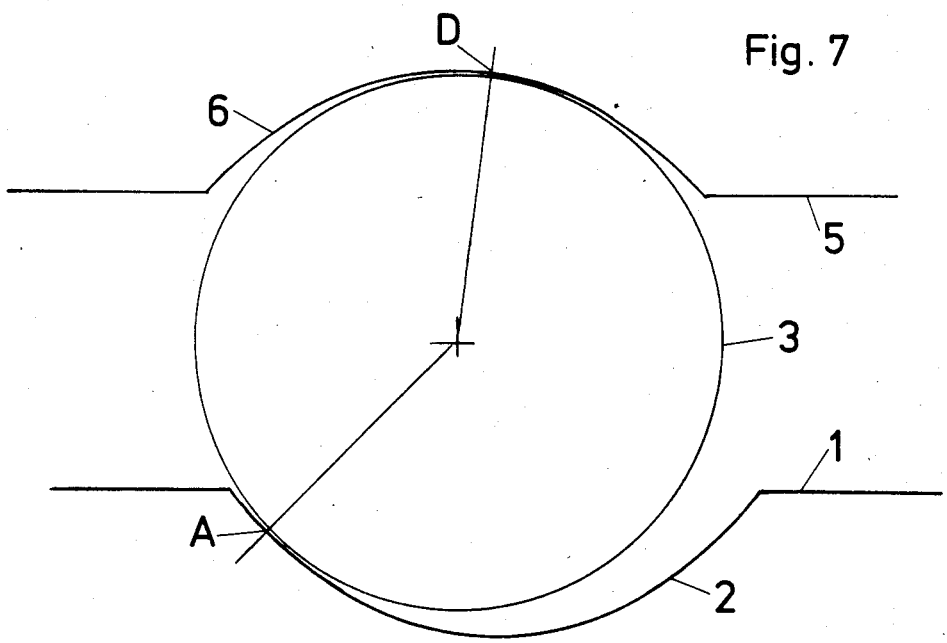
FIG. 7 is a fragmentary schematic sectional elevation illustrating a ball bearing of the present invention shown for high speeds of rotation.

By providing in accordance with the invention an angular-contact ball bearing as shown in FIGS. 6 and 7, where the part of the ellipse used for the groove 2 of the inner race means has at the contact point B in FIG. 6 the same radius as the groove of the inner race of FIG. 4 and at the contact point A in FIG. 7 the same radius as the radius of curvature of the inner race of FIG. 5, while also providing at the outer race means 6 a part of an ellipse where the radius of curvature at the point C in FIG. 6 is the same as the radius of the outer race groove of FIG. 4 and at point D in FIG. 7 has a radius which is the same as the radius of the outer race of FIG. 5, then there is provided a bearing, as shown in FIGS. 6 and 7, which has optimum features both for low speeds of operation as well as for high speeds of operation.

With the low speed of operation illustrated in FIG. 6 the rings 1 and 5 have at the contact points B and C the radius of curvature of the bearing of FIG. 4, so that the bearing has the optimal construction for this type of operation. With high speed operation the balls are pressed by centrifugal force in a direction toward the outer race means, so as to arrive in this way at the region of the point D of FIG. 7 where a closer fit and smaller clearance for the ball is provided with a smaller radius of curvature. At the same time, when the ball 3 contacts the point D in FIG. 7, there will be created for the ball at the groove 2 in the inner race means 1 a larger radial clearance since the ball becomes displaced away from the base of the groove 2 and becomes situated at the region of the looser fit or larger clearance having the larger radius of curvature at the point A in FIG. 7.

This change from the optimal clearance for operation at low speed, which is to say smaller clearance at the inner race means and large clearance at the outer race means (points B and C), to the optimal clearance for operation at high speed, which is to say large clearance at the inner race means and small clearance at the outer race means (points A and D), takes place in a stepless automatic manner as required by the operating conditions which are encountered. Thus, this construction provides an extremely important advantage of the present invention.

Figure 10:
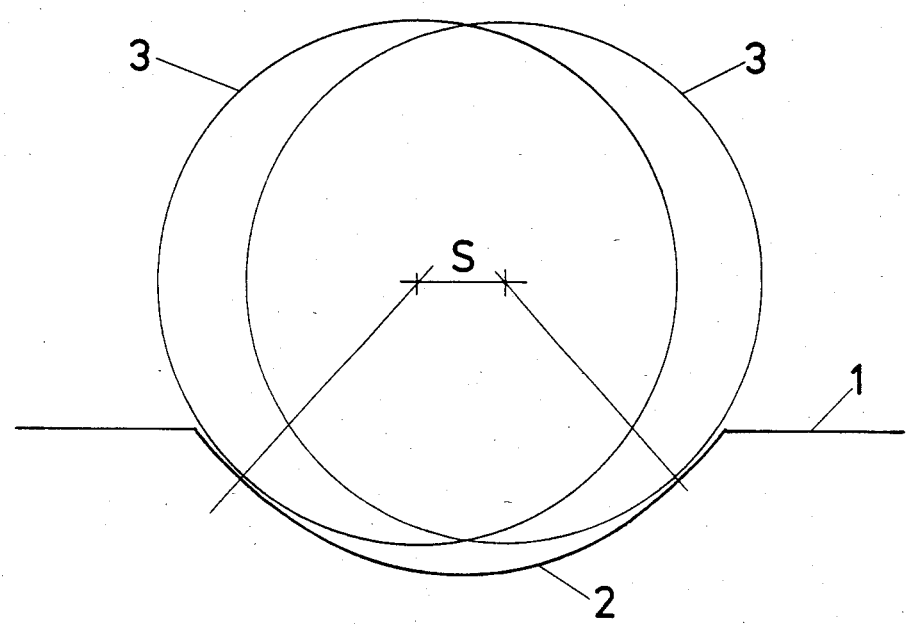
FIG. 10 is a fragmentary schematic sectional elevation of a ball bearing according to the present invention operating with a changing axial load.

A further advantage of the present invention is apparent in FIGS. 8-10. In many cases it is required that the bearing not only guide the shaft radially but also it must take up the axial guiding of the shaft during changing axial loads, so that it is often essential that the extent of axial shifting provided by the bearing be maintained as small as possible.

FIG. 8 illustrates a possible axial shifting S of the ball 3 at the inner race 1 with a conventional bearing having the construction shown in FIG. 2. In order to reduce this extent of axial shifting, use is made of the so-called 3-point bearing or 4-point bearing, the latter type of bearing being illustrated in FIG. 9. This type of conventional construction does indeed achieve a good axial guiding with a relatively small axial play, but such bearings cannot be also loaded radially.

However, the bearing of the invention which is illustrated in FIG. 10 can, as shown by the illustrated possible axial movement of the ball 3, provide for the shaft a small axial play while at the same time being capable of great radial loading.

The construction of the present invention provides the advantage that with increasing axial loading there is at the same time an increase not only of the contact angle but also of the radius of curvature of the groove of the race means at the zone of contact with the ball, with the result that the increase in the angle of contact is constantly retarded, so that angles of contact which are too large and which change to undesired extent are avoided.

With diminishing axial load or increasing radial load this angle becomes smaller and thus the radius of curvature at the contact zone also becomes smaller, so that the bearing of the invention is always capable of operating with a large radial load. In other words, with increasing axial force the capability of the bearing of the invention to absorb the axial force in a reliable manner is improved and with increasing radial force the capability of the bearing of the invention to reliably absorb the radial force is improved. Such ball bearings have heretofore been unknown. It is thus clear that the invention achieves important advantages.

In order to make use of this condition according to which the bearing of the invention automatically adapts itself to the particular operating conditions, it is sufficient to provide only the inner race means with a groove having in section the curvature of the present invention. A ball bearing which has an inner race means provided with the elliptical cross section of the present invention and an outer race means whose groove in section has the configuration of an arc of a circle, it is possible to achieve a construction which will provide optimal operation for low and high speeds of rotation and for large axial and radial loads.

According to the present invention, in order to obtain the advantages discussed above including the capability of the bearing of operating at high speeds without undue heating, the radius of curvature of the innermost part of the race groove is somewhat greater than the radius of the ball and, at the same time, the radius of curvature of the race groove gradually increases in a manner such that the radial clearance between the ball and the race groove (prior to the application of load) is generally greater than what the radial clearance would be if the race curvature were that of a circle whose radius is substantially 51.6% of the diameter of the ball.

For example, a race for use with a ball one-half inch in diameter can follow the arc of an ellipse defined by the well known equation $$\frac{x^2}{a^2} + \frac{y^2}{b^2} = 1,$$

in which a and b designate the major and minor semi-axes of the ellipse, x designates the distance along the major axis from a particular point on the major axis to the center of the ellipse, and y designates the distance perpendicular to that axis from that particular point to the periphery of the ellipse, and wherein a=0.3440 inches and b=0.2979 inches. Using the known equation, $r_1 = b^2/a$, the radius of curvature at the innermost part of the race groove is seen to be $r_i = 0.25798$ inches. This radius of curvature is somewhat greater than the radius of the ball, namely, 0.500 inches and, in particular, is about 51.6% of the diameter of the ball.

Furthermore, the radial clearance between the ball and the race groove (when the ball is in contact with the innermost part of the grove) according to the present invention at the indicated angles from the innermost part of the groove as compared to what the radial clearance would be if the race curvature were that of a circle whose radius is substantially 51.6% of the diameter of the ball (all prior to the application of load) is as follows:

| Degrees of Ball Circle | Radial Clearance 51.6% Circular Race | Elliptical Race |
|---|---|---|
| 1 | 1/4 | .11 |
| 2 | 3/4 | .47 |
| 3 | 1 1/8 | 1.06 |
| 4 | 2 1/8 | 1.90 |
| 5 | 3 | 2.99 |
| 6 | 4 3/4 | 4.33 |
| 7 | 6 | 5.93 |
| 8 | 7 5/8 | 7.81 |
| 9 | 9 5/8 | 9.97 |
| 10 | 11 7/8 | 12.43 |
| 11 | 14 1/4 | 15.19 |
| 12 | 17 | 18.29 |
| 13 | 19 3/4 | 21.72 |
| 14 | 23 | 25.52 |
| 15 | 26 5/8 | 29.69 |
| 16 | 30 | 34.26 |
| 17 | 33 7/8 | 39.25 |
| 18 | 37 7/8 | 44.68 |
| 19 | 42 | 50.58 |
| 20 | 46 5/8 | 56.97 |
| 21 | 51 3/8 | 63.87 |
| 22 | 56 3/8 | 71.31 |
| 23 | 61 5/8 | 79.32 |
| 24 | 67 | 87.92 |
| 25 | 72 1/2 | 97.15 |
| 26 | 78 1/2 | 107.02 |
| 27 | 84 1/4 | 117.02 |
| 28 | 90 5/8 | 128.85 |
| 29 | 97 1/4 | 140.86 |
| 30 | 103 5/8 | 153.65 |
| 31 | 110 1/4 | 167.24 |
| 32 | 117 1/4 | 181.66 |
| 33 | 124 | 196.95 |
| 34 | 131 | 213.13 |

It is seen from the above that from the radial clearance is generally greater in the case of the present invention, i.e., from at least 9°, than it would be in the case where the race curvature is that of a circle whose radius is substantially 51.6% of the diameter of the ball. This results in the advantages described above without the disadvantages which are inherent in the prior art bearings of the type disclosed in U.S. Pat. No. 2,142,478 (Murden) wherein the ellipse is always within the contour of the ball and a circular race whose radius is substantially 51.6% of the ball diameter.

An ellipse is uniquely suited for the radius of curvature required for the present invention both at the peak at one end of the major axis of the ellipse and the radius of curvature at a given distance from this peak. If use is made of a bearing the balls of which have a radius of 9.65 mm, as is in general conventional for radial ball bearings, the radius of curvature at the innermost part of a race groove of the invention is 10 mm (close fit for the ball) and at each side edge of the race groove of the invention there is a radius of curvature of 10.7 mm (a loose fit for the ball), so that the difference between the radii of curvature between the groove and ball at the innermost part of the groove is 0.35 mm while at each side edge of the groove this difference is 1.05 mm, so that in this case this difference increases from the innermost part of the groove toward each side edge thereof by a factor of 3.

With a race groove depth of 4.5 mm, use will be made of an ellipse where on half of one axis thereof has a length of 10.35 mm and one half of the other axis thereof has a length of 10.72 mm.

When selecting a race groove depth of only 2.25 mm, then the ellipse utilized for the curvature of such a groove will have for one half of its major axis a length of 11.32 mm and for one half of its minor axis a length of 10.64 mm. Such calculations are available to all persons skilled in the art.

Race grooves which in section have the configuration of an ellipse can be manufactured in an extremely simple manner inasmuch as it is only required for this purpose to provide the grinding periphery of a grinding wheel used to form the race groove with the elliptical profile.

The above-described embodiments of the invention have been referred to particularly with respect to radial ball bearings and radial angular-contact ball bearings. With axial angular-contact ball bearings there will also be all of the above advantages of the present invention as will be readily apparent to persons skilled in the art on the basis of the above description.

What is claimed is:

1. In a bearing capable of operating either as a radial ball bearing, a radial angular-contact ball bearing, or an axial angular-contact bearing, coaxial inner and outer race means respectively formed with ball grooves which face each other, and a plurality of balls of a given ball radius situated between said inner and outer race means and extending into said grooves thereof for rolling with respect to said inner and outer race means in said grooves, the improvement wherein at least one of said race means has at said groove thereof, in any axial plane containing the common axis of said race means, a cross-sectional configuration according to which the innermost part of said groove of said one race means has a radius of curvature which is greater than at least about 51.6% of the diameter of said ball while having a radius of curvature which increases in a continuous manner from said innermost part of said groove of said one race means toward each of a pair of opposed outer side edges of said groove, with the difference between the radius of curvature of said groove and said ball radius increasing from said innermost part of said groove to each of said side edges of said groove by at least a factor of 2, and wherein when the ball is in contact with the innermost part of the race groove the radial clearance between the ball and race groove in at least regions of said race groove proximate to each groove side edges is greater than what the radial clearance would be if the race curvature were that of a circle whose radius is substantially 51.6% of the diameter of the ball.

2. The combination of claim 1 and wherein the difference between the radius of curavture of said groove and the ball radius increases from said innermost part of said groove to each of said side edges of said groove by a factor of from 3 to 4.

3. The combination of claim 1 wherein said ball has a radius and said groove of said race means have a radius of curvature which are related to each other substantially as the circumference of a circle of one-half inch diameter is related to an ellipse defined by the equation $$\frac{x^2}{(.3440)^2} + \frac{y^2}{(.2979)^2} = 1.$$

4. The combination of claim 1 and wherein said groove of said one race means has in any axial plane a cross-sectional configuration of a conic section.

5. The combination of claim 4 and wherein said groove of said one race means has the cross-sectional configuration of an ellipse at the region of an end of the major axis thereof.

6. The combination of claim 5 and wherein an end of the major axis of said ellipse is situated at the innermost part of said groove of said one race means.

7. The combination of claim 1 and wherein said one race means is said inner race means.

* * * * *